United States Patent [19]
Lewis et al.

[11] Patent Number: 5,621,573
[45] Date of Patent: Apr. 15, 1997

[54] MICROOPTIC BIDIRECTIONAL MODULE

[75] Inventors: Warren H. Lewis, Newport, Pa.;
Robert W. Roff, Westfield, N.J.

[73] Assignee: The Whitaker Corporation, Wilmington, Del.

[21] Appl. No.: 443,987

[22] Filed: May 18, 1995

[51] Int. Cl.⁶ .......................... G02B 27/14; G02B 6/36; G02B 6/00
[52] U.S. Cl. ........................ 359/634; 385/92; 385/93; 385/137
[58] Field of Search ............................. 359/634; 385/92, 385/93, 94, 137

[56] References Cited

U.S. PATENT DOCUMENTS

| | | | |
|---|---|---|---|
| 4,262,362 | 4/1981 | Kiernan | 455/612 |
| 4,611,884 | 9/1986 | Roberts | 350/96.15 |
| 4,962,990 | 10/1990 | Matsuzawa | 324/244.1 |
| 4,979,791 | 12/1990 | Bowen et al. | 350/96.17 |
| 5,031,984 | 7/1991 | Eide | 385/27 |
| 5,127,075 | 6/1992 | Althaus et al. | 385/94 |
| 5,291,571 | 3/1994 | Kunikane | 385/93 |
| 5,347,605 | 9/1994 | Isaksson | 385/92 |
| 5,357,103 | 10/1994 | Sasaki | 250/227.24 |
| 5,400,419 | 3/1995 | Heinen | 385/14 |
| 5,404,414 | 4/1995 | Avelange et al. | 385/34 |
| 5,463,707 | 10/1995 | Nakata | 385/35 |
| 5,485,538 | 1/1996 | Bowen | 385/92 |
| 5,487,124 | 1/1996 | Bowen | 385/93 |
| 5,500,911 | 3/1996 | Roff | 385/33 |

FOREIGN PATENT DOCUMENTS

| | | | |
|---|---|---|---|
| 2509479 | 1/1983 | France | 385/44 |
| 2556480 | 6/1985 | France | 385/44 |
| 61-9610 | 1/1986 | Japan | 385/44 |
| 2162336 | 1/1986 | United Kingdom | 286/42 |

OTHER PUBLICATIONS

*Xerox Disclosure Journal;* vol. 6; No. 5; Sept./Oct. 1981; pp. 249–251.

Primary Examiner—Georgia Y. Epps
Assistant Examiner—Ricky Mack
Attorney, Agent, or Firm—W. Francos

[57] ABSTRACT

A bidirectional link for simultaneous or sequential transmission and reception of optical signals is disclosed. A simple alignment process is used in which the emitter or transmitter is disposed in a subassembly having a subhousing with a beamsplitter therein. This is then inserted into the main housing with the other device mounted therein.

7 Claims, 2 Drawing Sheets

MICROOPTIC BIDIRECTIONAL MODULE

FIELD OF THE INVENTION

The invention of the present application relates to a bidirectional optical link for optical transceiving.

BACKGROUND OF THE INVENTION

The advent of optical communication links has offered increased data communication capabilities over their lower frequency electromagnetic radiation counterparts. This increased capability has not come without increased costs, and there is a great need for low cost data links in the optical frequency band. While component expenses are often the source of the high costs of data links, another is the labor input to the alignment of the devices in the links. To this end, there is a great need to effect a data link that is not plagued by the need of labor intensive alignment efforts in the manufacture of the data links.

Bi-directional data links are generally composed of an optical transmitter such as a laser or LED that transmits modulated light signals at a first frequency and a photodetector such as a PIN photodiode that detects a light signal at a second frequency different than the transmission frequency, thereby reducing or eliminating the possibility of signal cross-talk. The light of the transmitted and received frequencies is conveyed via a common optical fiber, and can be sequentially or simultaneously transmitted or received. The module having the transmitter, receiver and optical coupling elements is located at one end of a fiber link. An example of such a bidirectional optical module is as shown in U.S. Pat. No. 5,127,075 to Althaus, et al., the disclosure of which is specifically incorporated herein by reference. Althaus, et al. discloses a bidirectional link that uses a hermetically sealed TO can transmitter and a hermetically sealed TO can receiver that are mounted in a common hollow housing to effect the bidirectional module. The TO cans are mounted in an orthogonal fashion and an optical fiber transmits light to and from the module. A beamsplitter is located in the optical path of the fiber and directs light from the fiber to the detector. This beamsplitter can be wavelength dependant or a proportional splitter that deflects light in a defined intensity to the detector and the receiver. The wavelength selectivity requirement of the detector and emitter is then effected by selective wavelength filtering prior to the light's impinging on the detector or emitter. The various subassemblies are then adjusted for optical alignment and finally fixed in final position. The drawback to this configuration is that the autonomous emitter and detector are aligned in the common housing either iteratively or successively with the various optical elements of the system to optimize the input and output performance. This approach is clearly a complicated and labor intensive approach, which accordingly increases the cost of the device. Furthermore, in the preferred embodiment, the lens element for the light emitter is within the encapsulation, and the optical alignment of this due to the close proximity of the lens to the emitter is rather difficult, and thus a labor intensive effort that serves to further increase the cost of manufacture.

Another example of a bidirectional link is as disclosed in U.S. Pat. No. 5,347,605 to Isaksson the disclosure of which is specifically incorporated herein by reference. This reference like the Althaus, et al. reference discussed above also makes use of an orthogonally oriented emitter and detector assembly having the emitter and detector mounted in a housing. The alignment of the emitter and detector is effected by the use of a rotatable member that allows relative positioning of the emitter, detector and optical focusing elements. While the rotating member facilitates the alignment process, this reference like the Althaus reference requires active alignment of the emitter relative to the detector, an alignment process that is complex, labor intensive and thereby drives the cost of the device. What is needed is a bidirectional link that has the advantages of hermeticity and low cross-talk signal transmission and reception, and yet is fabricated with great simplicity and thereby low cost.

SUMMARY OF THE INVENTION

The present invention is a bidirectional link that allows sequential or simultaneous transmission and reception of optical signals using conventional components. The device is fabricated in a relatively simple alignment process and accordingly has the advantage of low cost and lower labor intensive alignment and fabrication input. To effect the relatively simple alignment of the devices and components, the emitter or transmitter is disposed in a subassembly having a sub-housing with the required optical focusing beamsplitting elements disposed therein. This subassembly is optically aligned in a relatively simple active alignment process, and the subassembly is then inserted into the main housing of the bidirectional link. At this stage, a detector is mounted in the main housing and is aligned optically with the pre-aligned elements of the sub-assembly described above. The detector is then fixed using common adhesive and the assembly of the bidirectional link is complete.

OBJECTS, FEATURES AND ADVANTAGES OF THE INVENTION

It is an object of the present invention to have a bidirectional optical link that separates the alignment of the components of the link into a two step process and simplifies drastically the alignment process.

It is a feature of the present invention to have a first assembly containing the emitter, optical focusing elements and the beamsplitting element aligned therein and prior to final assembly of the bidirectional link in a housing having the detector.

It is an advantage of the present invention to have a bidirectional optical link that is fabricated at low cost by virtue of its simplicity of fabrication.

DETAILED DESCRIPTION OF THE PREFERRED EMBODIMENTS

Figure 1:
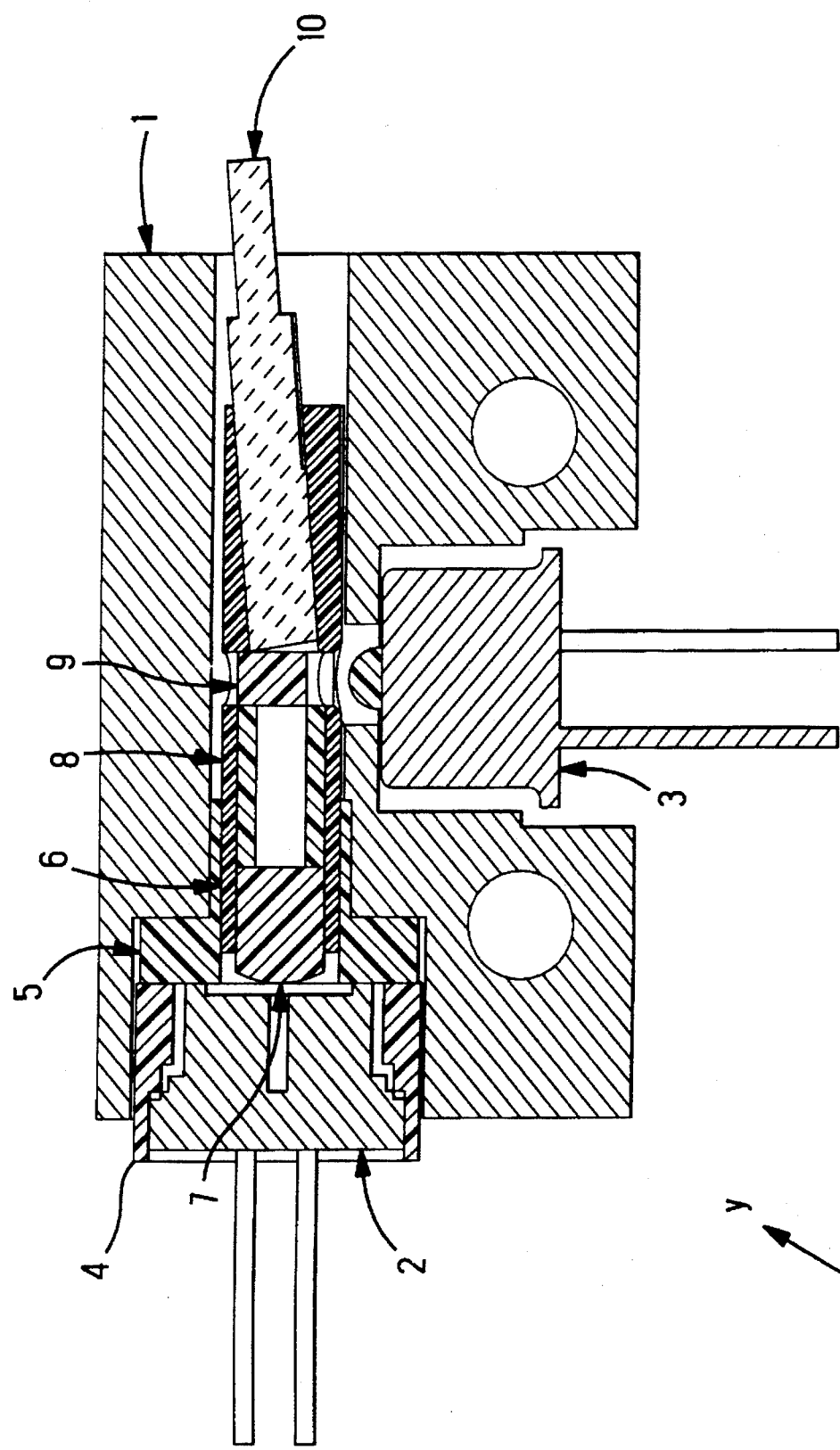
FIG. 1 is a cross-sectional view of the present invention.

Turning to FIG. 1, we see the cross section of the bidirectional module 1 the present invention. The main housing 1 has contained therein the sub-housing 5 which houses the optical coupling elements of the module as well as the light emitter 2. The operation of the bidirectional link is as follows. The light emitter 2 is preferably a laser diode mounted in a TO can, although an LED similarly mounted in a TO can while less preferable is functional in this capacity. The light emitted from the emitter 2 is of a first wavelength, preferably 1310 nm, and is focused within the acceptance angle of the optical fiber 10. A graded refractive index (GRIN) lens 7 is mounted in the sub-housing as shown, and a spacer tube 8 is similarly mounted. Less preferably, other lenses such as a rod lens or other suitable lens can be used instead of the GRIN lens 7. The spacer tube allows the correct distance between the lens 7 and the fiber to be achieved to enable proper coupling between the emitter and the fiber 10. Finally, positioned between the spacer tube 8 and the fiber 10 is a beamsplitter 9 which can be a wavelength insensitive splitter which sends for example 50% of the incident power to the detector, or it can be a wavelength dependant splitter such as a piece of dichroic material, or a piece of optical grade glass with a dichroic coating disposed thereon. In either the case of a wavelength insensitive or wavelength selective beamsplitter 9, half duplex or full duplex communication can be realized by the present invention.

There are some very important consideration that drive the design and component selection of the module, and these are discussed presently. One of the important features of an effective transceiver unit such as the bidirectional module is signal isolation. To this end, the transmitted signal is generally at a first wavelength or frequency, and the received signal is at a second wavelength or frequency. Signal distortion between the two signals reduces the performance of the device and must be reduced greatly if the proper function of the device is to be achieved. Cross talk is also caused by back reflection to the fiber and devices of the system.

To minimize cross talk problems, the following measures were taken. First, the fiber endface is polished at an angle so that Fresnel reflections are at an angle that will not be supported by the fiber waveguide. This angle on the endface of the fiber is also chosen so that light from the emitter is not reflected back to be impingent on the emitter. The cant of the fiber within the subhousing is chosen to re-orient light from the fiber to the elements of the subassembly, that is to compensate for the angled enface of the fiber. Further details of the canted fiber and lens can be found in U.S. Pat. No. 5,500,911, and assigned to the assignee of the present invention.

To achieve signal isolation in the event that two wavelengths, one for transmission and one for reception, the beamsplitter is preferably dichroic in nature. The beamsplitter 9 will generally have an antireflective coating as well a dichroic coating that achieves refraction that is wavelength dependent. The dichroic coating is a multi-layer interference coating where each layer is of a selected thickness and dielectric constant value. The selection of layer thickness and dielectric constant allows for the direction of the incident radiation through reflection and interference. That is to say the light is directed according to its wavelength, with the reception wavelength being directed to the detector, and the transmission wavelength being directed to the fiber 10. Finally, this multi-layer coating enables light direction as described to be achieved substantially independently of the polarization of the light. Light that is incoming from the fiber at 1550 nm, the exemplary reception wavelength, is directed by the beamsplitter to the detector. As a precaution, a wavelength selective filter is disposed on the detector assembly to pass only the desired reception wavelength, 1550 nm in our example. Contrastingly, light from the emitter at a wavelength different from the reception wavelength passes through the beamsplitter so as to couple to the fiber 10. A surface which is partially reflective and partially transmissive for a single wavelength could also be used as the beamsplitter and as with the dichroic beamsplitter, both full and half duplex communication can be effected. To this end, either a single wavelength is used as the carrier for both transmission and reception, or a reception wavelength different from the transmission wavelength is used.

Figure 2:
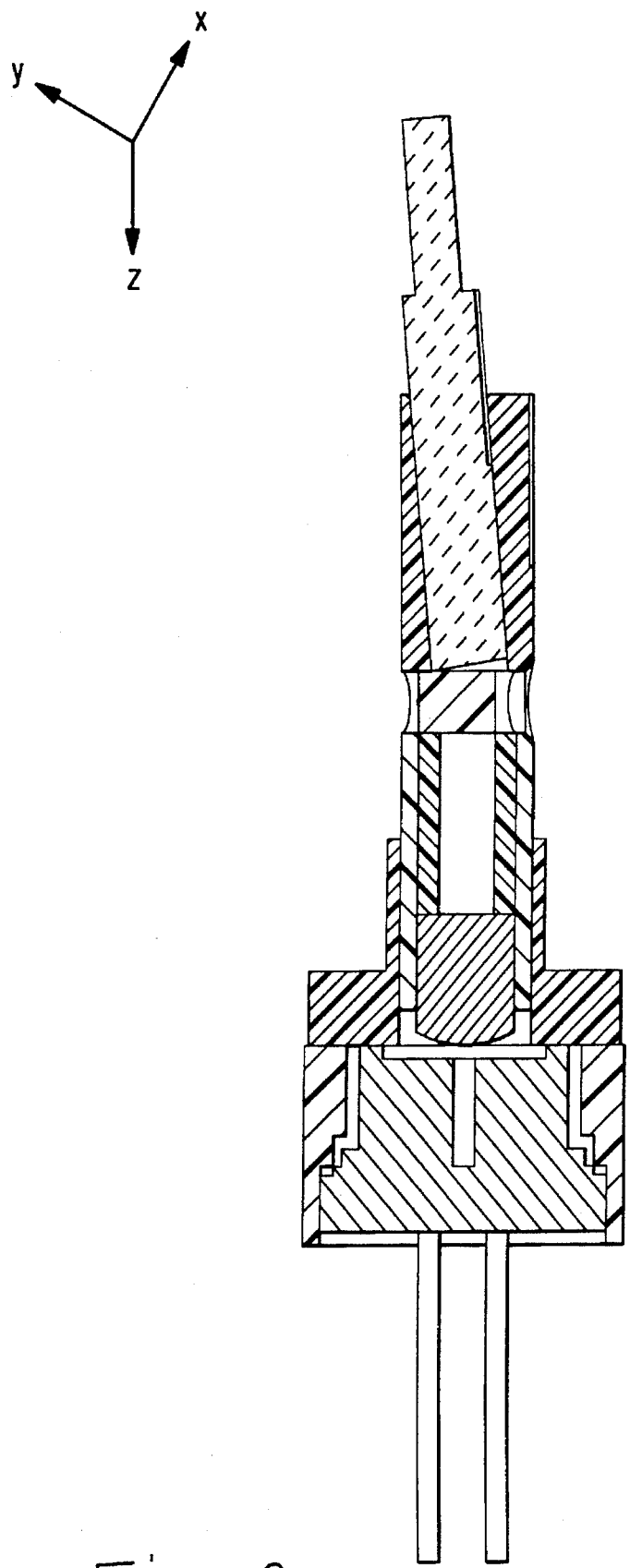
FIG. 2 is a cross-sectional view of the subassembly of the present invention.

Turning to FIG. 2, we see the subassembly of the present invention. The subassembly has the above described components mounted therein, and adjustment to align the components is effected rather easily as is described presently. In effecting alignment of the laser and the optical components of the subassembly, first a rough alignment in two dimensions is made (for example x,y in a Cartesian coordinate system). Then adjustment is made in the z direction and the components are welded by standard technique to fix the components with respect to the z direction. Then, the components are re-adjusted in the x and y directions as they are moved during the z direction welding operation. Finally, the components are fixed in the x and y directions by welding.

After the subassembly is properly aligned and the components are fastened through the welding as described above, the subassembly is inserted in the main housing. At this point, the detector is aligned within two degrees of freedom, and when optimum performance is achieved, the detector is secured through the use of a suitable adhesive.

The above description teaches the bidirectional module of the present invention for two direction optical communication via an optical waveguide. It is anticipated that modification within the purview of the skilled artisan are achievable from the teachings of the above disclosure. Such teaching are considered within the theme and spirit of the present invention.

We claim:

1. A bi-directional optical interconnect, comprising:

a subassembly having a first housing, said first housing having disposed therein in a first linear orientation a light source coupled optically to a lens element, said lens element coupled optically to a beam splitter and said beam splitter coupled optically to an optical fiber held in a ferrule, said optical fiber having a endface adjacent said beam splitter angled to reduce back reflections to the fiber and to the light source, and said ferrule canted at an angle relative to said endface; and a main housing, said main housing having a first cavity for receiving a light detector, and a second cavity for receiving said subassembly, said first cavity oriented substantially colinearly with said linear orientation of said first housing, and said second cavity oriented substantially orthogonally to said first cavity.

2. A bidirectional optical interconnect as recited in claim 1, wherein said light source emits light at a first wavelength and said light detector detects light at a second wavelength.

3. A bidirectional optical interconnect as recited in claim 2, wherein said beamsplitter is a dichroic element that directs light of said second wavelength to said light detector and passes light from said light at said first wavelength to said optical fiber substantially undeflected.

4. A bidirectional optical interconnect as recited in claim 2, wherein said beamsplitter is a partially reflecting element, said partially reflecting element reflecting a portion of light from said optical fiber to said detector, and said partially reflecting element transmitting a portion of said light from said light source to said optical fiber.

5. A bidirectional optical interconnect as recited in claim 1, wherein said light source transmits light at the same wavelength that said light detector detects light.

6. A bidirectional optical interconnect as recited in claim 1, wherein the interconnect effects full duplex communication.

7. A bidirectional optical interconnect as recited in claim 1, wherein the interconnect effects half duplex communication.

* * * * *